(12) United States Patent
Heuel et al.

(10) Patent No.: US 10,509,107 B2
(45) Date of Patent: Dec. 17, 2019

(54) DEVICE, SYSTEM AND METHOD FOR SIMULATING AT LEAST ONE ECHO SIGNAL OF AN ELECTROMAGNETIC SIGNAL

(71) Applicant: Rohde & Schwarz GmbH & Co. KG, Munich (DE)

(72) Inventors: Steffen Heuel, Munich (DE); Sherif Ahmed, Starnberg (DE); Bernhard Schaffer, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 272 days.

(21) Appl. No.: 15/406,332

(22) Filed: Jan. 13, 2017

(65) Prior Publication Data
US 2018/0203098 A1 Jul. 19, 2018

(51) Int. Cl.
*G01S 7/40* (2006.01)

(52) U.S. Cl.
CPC .................. *G01S 7/4052* (2013.01)

(58) Field of Classification Search
CPC .................. G01S 7/4052; G06G 7/78
USPC .................................................. 342/172
See application file for complete search history.

(56) References Cited

U.S. PATENT DOCUMENTS

| | | | | |
|---|---|---|---|---|
| 4,660,041 A | * | 4/1987 | Maples | G01S 7/40 342/170 |
| 5,177,488 A | * | 1/1993 | Wang | G01S 7/4052 250/227.12 |
| 5,838,210 A | * | 11/1998 | Midya | H03C 1/06 332/109 |
| 5,892,479 A | * | 4/1999 | Mills | G01S 7/4052 342/169 |
| 6,496,139 B1 | * | 12/2002 | Flacke | G01S 7/4052 342/165 |
| 2016/0087734 A1 | * | 3/2016 | Kordik | H04B 17/0085 455/67.14 |
| 2017/0115378 A1 | * | 4/2017 | Haghighi | G01S 7/4052 |

FOREIGN PATENT DOCUMENTS

CN 102590794 A 7/2012

* cited by examiner

*Primary Examiner* — Timothy X Pham
(74) *Attorney, Agent, or Firm* — Schwabe, Williamson & Wyatt, P.C.

(57) ABSTRACT

A device for simulating at least one echo signal of a signal is described, said device comprising an input for receiving the signal, a signal manipulation unit and an output for transmitting the signal processed by said signal manipulation unit. Said signal manipulation unit is configured to add a delay to the signal, to change the frequency of the signal and/or to change the amplitude of the signal. Said device further comprises at least one bandwidth changing unit. Said bandwidth changing unit is configured to change the frequency bandwidth of the signal. In addition, a system and a method for simulating at least one echo signal of a signal are described.

17 Claims, 2 Drawing Sheets

Figure 1:
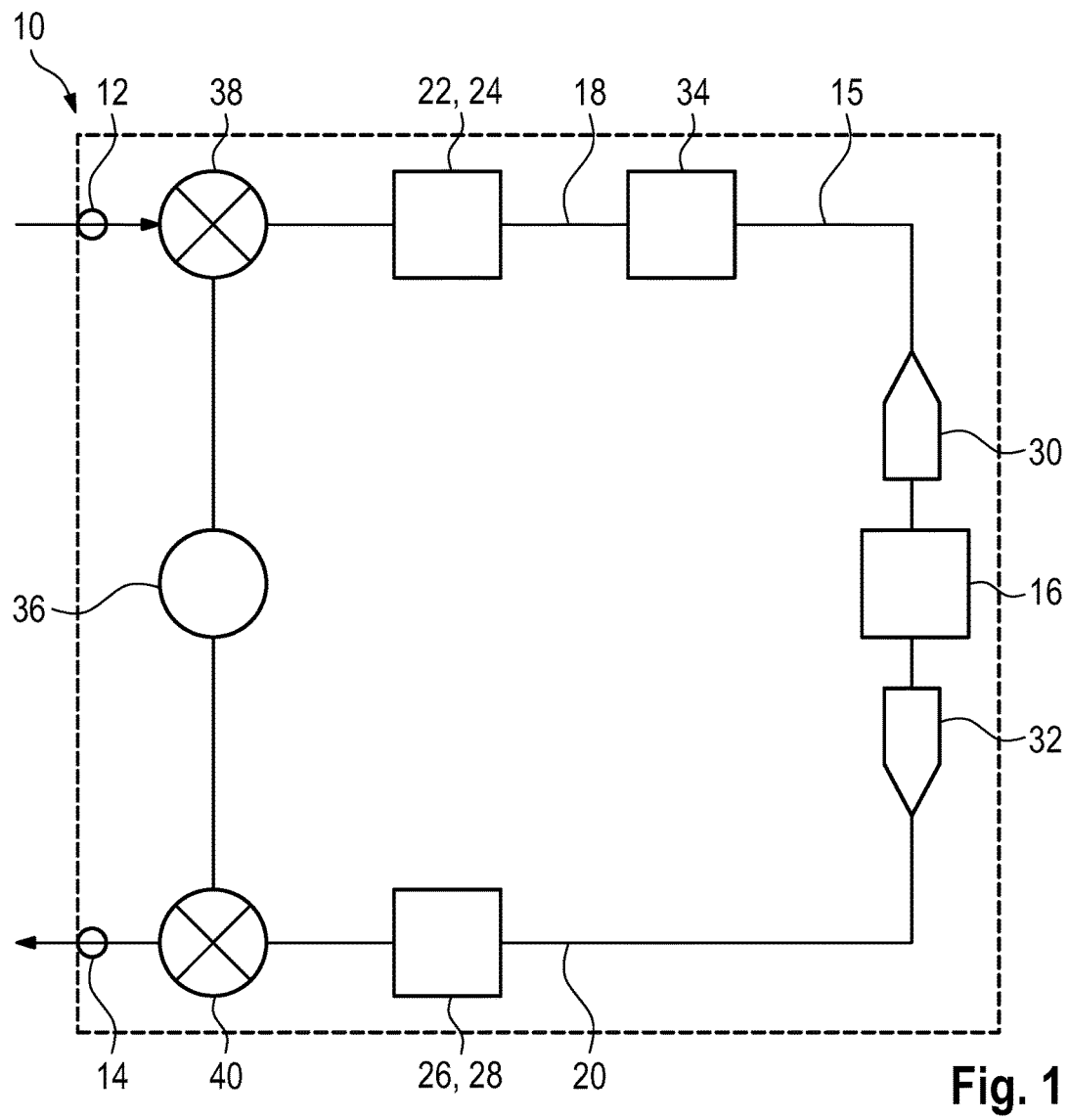

DEVICE, SYSTEM AND METHOD FOR SIMULATING AT LEAST ONE ECHO SIGNAL OF AN ELECTROMAGNETIC SIGNAL

TECHNICAL FIELD

The invention relates to a device for simulating at least one echo signal of a signal, a system for simulating at least one echo signal of a signal and a method for simulating at least one echo signal of a signal.

BACKGROUND OF THE INVENTION

Devices for simulating echo signals of an electromagnetic signal are inter alia used for radar target simulation. In the state of the art, target simulators are known that use fiber optic delay line simulators (FODL) that can simulate high signal bandwidths. However, FODL simulators can only be used for simulating static targets.

Other devices used in the state of the art for simulating radar targets comprise digital target simulators that can simulate moving targets. However, these devices can only be used for small signal bandwidths due to the limitations of the analog to digital converter.

Therefore, the devices and techniques known in the prior art have different drawbacks and advantages.

Accordingly, there is a need for a cost efficient device for simulating echo signals of an electromagnetic signal that overcomes the drawbacks of the known systems. Particularly, there is a need for a device for simulating echo signals of an electromagnetic signal that is configured to simulate at least one echo signal of an electromagnetic signal, for instance simulating radar targets, wherein a high frequency bandwidth can be used while simulating moving targets.

SUMMARY OF THE INVENTION

The invention provides a device for simulating at least one echo signal of a signal, said device comprising an input for receiving the signal, a signal manipulation unit and an output for transmitting the signal processed by said signal manipulation unit. Said signal manipulation unit is configured to add a delay to the signal, to change the frequency of the signal and/or to change the amplitude of the signal. Said device further comprises at least one bandwidth changing unit, said bandwidth changing unit being configured to change the frequency bandwidth of the signal.

The invention also provides a system comprising a broadband radar source and a device as described above.

Further, the invention provides a method for simulating at least one echo signal of a signal by using a device for simulating at least one echo signal of a signal, in particular by using a device as described above, with the following steps:

a) Inputting a signal via an input of said device,
b) Manipulating said signal by using a signal manipulation unit, and
c) Changing the frequency bandwidth of the signal before and/or after said signal manipulation unit.

The invention is based on the finding that an echo signal of a broadband signal can be simulated even though the echo signal is simulated such that a target is simulated in a moving manner that radiates the echo signal. The simulated movement of the target can be realized since a digital signal manipulation unit is applied simulation purposes wherein an analog to digital converter may be used for digitizing the signal that typically limits the useable frequency bandwidth of the signal. According to the invention, the useable frequency bandwidth is not limited by the analog to digital converter during the echo signal simulation since the frequency bandwidth of the signal is changed. Thus, the frequency bandwidth of the signal processed by the signal manipulation unit is lower than the limiting bandwidth of the analog to digital converter. The output signal corresponds to the echo signal and the simulated target respectively as the incoming signal representing the radar signal is manipulated appropriately. The manipulation can be performed by altering the in-phase and quadrature components of the signal that are also called IQ data. In other words, the input signal, in particular the input signal that will be used as broadband radar signal for detecting targets, is received via the input of the device. The signal is manipulated in order to simulate a moving radar target wherein the frequency bandwidth of the signal processed by the device is changed, in particular the input signal and/or the manipulated signal.

Generally, a signal path may be provided that goes from the input to the output. The signal processed is forwarded along that signal path and processed by the different components positioned within the signal path.

According to an aspect, the at least one bandwidth changing unit is configured to decrease the frequency bandwidth of the signal. Thus, the frequency of the input signal is changed such that the frequency bandwidth can be used for further processing, in particular for being used by the signal manipulation unit.

Said at least one bandwidth changing unit may be located nearer to said input than to said output. Hence, the bandwidth changing unit is located within the signal path closer to the input than the output wherein that bandwidth changing unit is also configured to decrease the frequency bandwidth of the signal.

Accordingly, the frequency bandwidth of the signal processed is decreased initially, in particular prior to manipulating the signal in the signal manipulation unit.

Particularly, said at least one bandwidth changing unit is a divider, for instance a divider being consistent with regard to the amplitude. The frequency bandwidth of the signal forwarded to the signal manipulation unit is decreased such that the frequency bandwidth of the signal forwarded is within the limits of any analog to digital converter that is upstream the signal manipulation unit. Hence, the input signal can be divided appropriately. For instance, the divider has a division ratio that can be adapted, in particular in a digital manner. As the divider is consistent with regard to the amplitude, the amplitude of the signal is not changed while changing the frequency bandwidth.

According to another aspect, said at least one bandwidth changing unit is configured to increase the frequency bandwidth of the signal. The frequency bandwidth of the signal being manipulated can be increased accordingly.

Said at least one bandwidth changing unit may be located nearer to said output than to said input. Thus, the bandwidth changing unit is located within the signal path closer to the output than the input wherein that bandwidth changing unit is also configured to increase the frequency bandwidth of the signal. Accordingly, the frequency bandwidth of the signal processed is increased finally, in particular after manipulating the signal in the signal manipulation unit.

Particularly, said at least one bandwidth changing unit is a multiplier, for instance a multiplier being consistent with regard to the amplitude. The multiplier is configured to multiply the signal manipulated by the signal manipulation unit such that a radio frequency signal is generated. As the multiplier is consistent with regard to the amplitude, the amplitude of the signal is not changed while changing the frequency bandwidth.

According to a certain embodiment, said device comprises two bandwidth changing units. Both bandwidth changing units may be configured to decrease and increase the frequency bandwidth of the signal, respectively. Thus, the frequency bandwidth of the signal may be decreased such that the signal can be manipulated in a digital manner, in particular converted into a digital signal without being limited by the analog to digital converter. Afterwards, the frequency bandwidth of the manipulated signal is increased, in particular to the original frequency bandwidth.

According to another aspect, a first bandwidth changing unit is positioned before said signal manipulation unit. Thus, the frequency bandwidth of the signal processed by the signal manipulation unit is changed such that the signal manipulation unit is fed with a signal having a frequency bandwidth changed with respect to the original one.

Further, a second bandwidth changing unit may be positioned after said signal manipulation unit. Hence, the frequency bandwidth of the manipulated signal is changed (again) such that a radio frequency signal can be output. For instance, the frequency bandwidth is changed to the original frequency bandwidth of the signal being input to the device.

Particularly, said first bandwidth changing unit is configured to decrease the frequency bandwidth of said signal and/or said second bandwidth changing unit is configured to increase the frequency bandwidth of said signal. Accordingly, a radio frequency signal may be input to the device wherein this signal is decreased by the first bandwidth changing unit such that a signal having a decreased frequency bandwidth is forwarded to the signal manipulation unit. Accordingly, certain manipulating techniques can be applied enabling simulation of a moving target, for instance. After manipulating the signal, the manipulated signal is forwarded to the second bandwidth changing unit that increases the frequency bandwidth of the signal processed again such that a broadband signal is output by the device.

According to a preferred embodiment, said manipulation unit is positioned between said first bandwidth changing unit and said second bandwidth changing unit. Thus, the frequency bandwidth of the signal processed by the manipulation unit is changed twice, up- and downstream the signal manipulation unit. This ensures that broadband signals can be processed by the device and manipulated by a digital signal manipulation unit used for simulating moving targets.

Said signal manipulation unit may be positioned between a first bandwidth changing unit and a second bandwidth changing unit, said first bandwidth changing unit being configured to decrease the frequency bandwidth of said signal, said second bandwidth changing unit being configured to increase the frequency bandwidth of said signal. Accordingly, the frequency bandwidth of the signal processed is decreased initially. Then, a delay is added to the signal by the signal manipulation unit. Afterwards, the signal processed is increased, in particular to the original frequency bandwidth.

Further, an analog to digital converter and a digital to analog converter may be provided, said signal manipulation unit being positioned between said analog to digital converter and said digital to analog converter. As the manipulation unit can be a digital one, the manipulation unit is assigned to an analog to digital converter that converts the analog signal received into a digital one for manipulating purposes. Then, the digital signal can be processed by the signal manipulation unit while simulating a moving target. Accordingly, a delay can be added to the signal, the frequency of the signal can be shifted and/or the amplitude of the signal is changed. These parameters may alter when a radar signal is reflected by a moving target. In other words, the IQ data of the signal are amended appropriately. After the manipulating step, the digital and manipulated signal is re-converted into an analog signal by using a digital to analog converter.

At least one mixing stage may be provided, said mixing stage being assigned to said bandwidth changing unit. The mixing stage is also connected to a local oscillator that inputs a certain frequency. Particularly, two mixing stages are provided that both are connected to the local oscillator wherein the mixing stages are positioned in an input line and an output line, respectively. The mixing stages may correspond to an up- and a down-converter, respectively.

According to an aspect, a delay is added to said signal, the frequency of said signal is changed and/or the amplitude of said signal is changed during the manipulating step. Thus, it is ensured that a moving target can be simulated by using the different parameters that may be altered by the manipulation unit appropriately.

According to another aspect the frequency bandwidth of said signal is decreased before the manipulating step. Hence, broadband signals can be input wherein the frequency is decreased for digital processing such that the analog to digital converter does not limit the useable frequency bandwidth of the signal.

Furthermore, the frequency bandwidth of said signal may be increased after the manipulating step. Thus, a broadband signal is output by the device even though a digital manipulating technique for simulating moving targets is used.

BRIEF DESCRIPTIONS OF DRAWING

Figure 2:
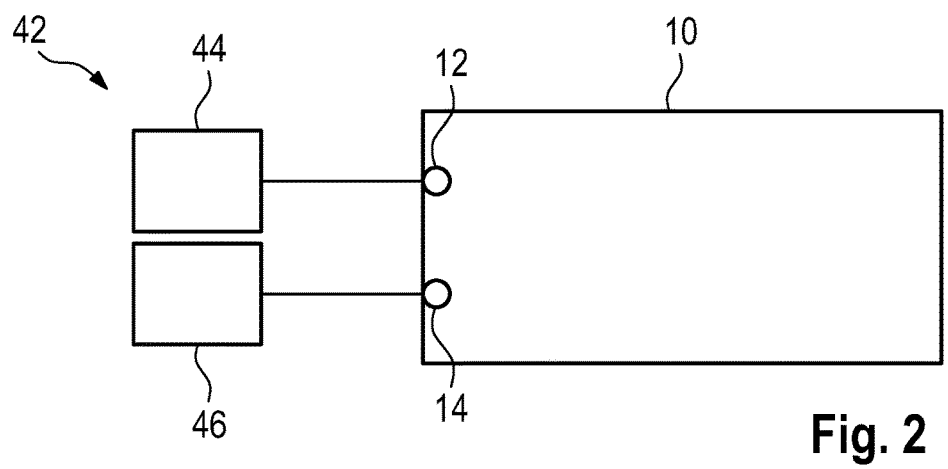
Figure 3:
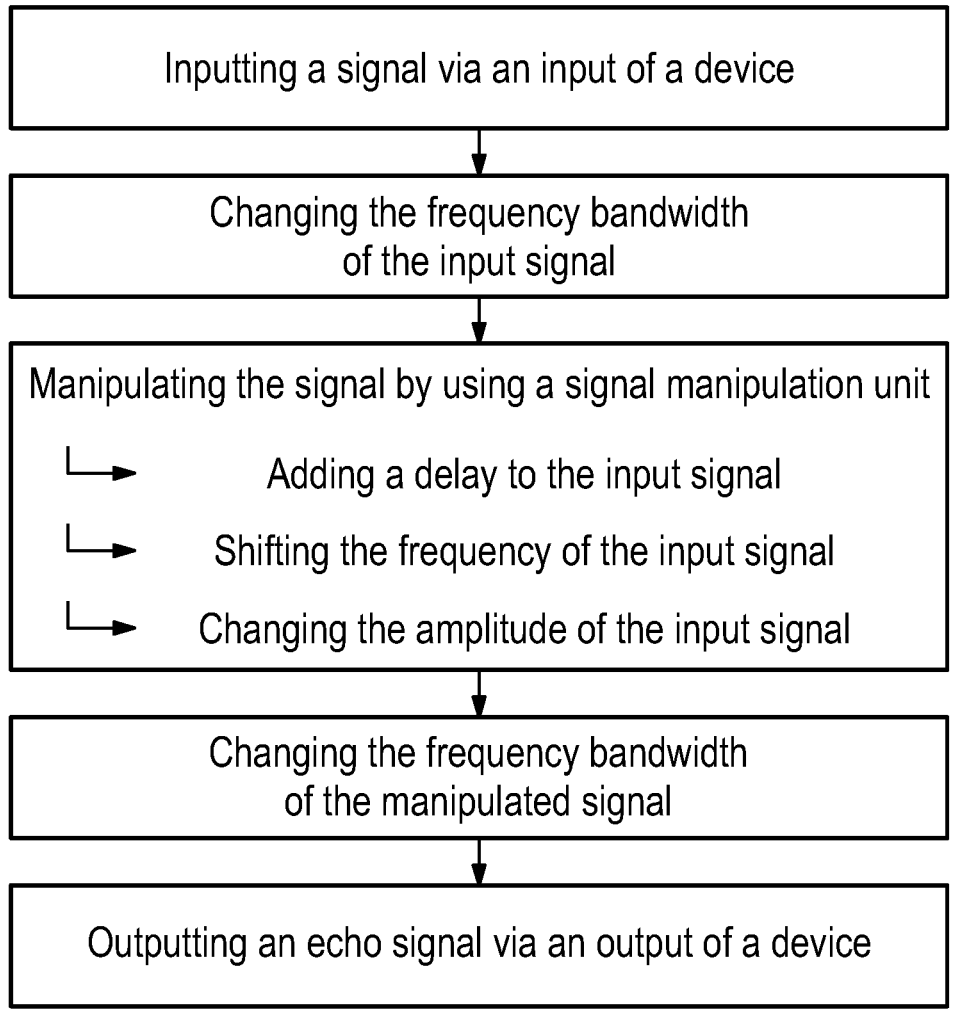

The invention will now be described with reference to an exemplary embodiment that is shown in the enclosed drawings. In the drawings:

FIG. 1 schematically shows a device for simulating at least one echo signal of a signal according to the invention, FIG. 2 schematically shows a system for simulating at least one echo signal of a signal according to the invention, and FIG. 3 shows a flow-chart representing a method for simulating at least one echo signal of a signal according to the invention.

DETAILED DESCRIPTION OF EXAMPLE EMBODIMENT

In FIG. 1, a device 10 for simulating at least one echo signal of an electromagnetic signal is shown that comprises an input 12 for receiving an electromagnetic signal, in particular a radio frequency signal. Further, the device 10 has an output 14 for transmitting the signal that has been processed by the device 10. Between the input 12 and the output 14, a signal path 15 is established along which the signal is forwarded.

For processing purposes, the device 10 comprises a signal manipulation unit 16 that is configured to add a delay to the signal, to shift the frequency of the signal and/or to change the amplitude of the signal.

The signal manipulation unit 16 is connected to the input 12 via an input line 18 and to the output 14 via an output line 20, respectively.

Further, the device 10 comprises a first bandwidth changing unit 22 that is positioned in the input line 18. In the shown embodiment, the first bandwidth changing unit 22 is configured to decrease the frequency bandwidth of the input signal. Hence, the first bandwidth changing unit 22 may be a divider 24, in particular a divider that is consistent with regard to the amplitude. Thus, the amplitude of the signal processed by the divider 24 is not changed while the frequency bandwidth is changed.

In addition, the device 10 comprises a second bandwidth changing unit 26 that is positioned in the output line 20 wherein the second bandwidth changing unit 26 is configured to increase the frequency bandwidth of the signal processed. Hence, the second bandwidth changing unit 26 may be a multiplier 28, in particular a multiplier that is consistent with regard to the amplitude. Accordingly, the second bandwidth changing unit 26 changes the frequency bandwidth of the signal processed while maintaining its amplitude.

Accordingly, the signal manipulation unit 16 is positioned between the first bandwidth changing unit 22 and the second bandwidth changing unit 26 such that the frequency bandwidth of the input signal is changed by the first bandwidth changing unit 22, in particular decreased. Then, the signal is forwarded to the signal manipulation unit 16 that manipulates the signal with regard to the time (adding a delay), the frequency and/or the amplitude in a controlled manner for simulating a moving target. Afterwards, the frequency bandwidth is chanced again, in particular increased, by using the second bandwidth changing unit 26 such that the frequency bandwidth of the output signal is multiplied to be original frequency bandwidth of the input signal.

As the manipulation unit 16 is configured to manipulate the input signal in a digital manner, an analog to digital converter 30 and a digital to analog converter 32 are positioned upstream and downstream the signal manipulation unit 16 respectively. Hence, the signal processed by the device 10 is digitized by the analog to digital converter 30 before the signal is manipulated by the signal manipulation unit 16 using digital techniques. Afterwards, the manipulated signal is reconverted into an analog signal by using the digital to analog converter 32.

The device 10 also comprises at least one filter 34 that may be positioned between the divider 24 and the analog to digital converter 30.

In addition, the device 10 comprises a local oscillator 36 that is connected to a first mixing stage 38 being assigned to the input line 18 as well as a second mixing stage 40 being assigned to the output line 20. Accordingly, the radio frequency signal input can be mixed down by using the first mixing stage 38 whereas the manipulated signal can be mixed up while using the second mixing stage 40. The second mixer 40 as well as the first mixer 38 both are controlled by the same control unit such that is ensured that the signal processed by the device 10 is remixed to the original radio frequency signal that has been input, in particular the radar signal input.

The manipulated signal that is output by the device 10 simulates the echo signal corresponding to a moving target detected by the radar signal input.

In FIG. 2, a system 42 is shown that can be used for simulating and analyzing an echo signal. The system 42 comprises a device 10, a broadband signal source 44 and an analyzing unit 46. The broadband signal source 44 is configured to emit a broadband radar signal that is typically used for detecting a target by using radar techniques.

As shown in FIG. 2, the broadband signal source 44 is connected to the input 12 whereas the analyzing unit 46 is connected to the output 14 of the device 10 such that a broadband radar signal is input for simulating the echo signal. The simulated echo signal is output and forwarded to the analyzing unit 46 via the output 14. Then, the simulated echo signal is analyzed by the analyzing unit 46.

The analyzing unit 46 may have a controlling function such that the device 10 is controlled appropriately, in particular the signal manipulation unit 16, the local oscillator 36 and/or the filter 34.

According to a certain embodiment, the system 42 is formed integrally such that the device 10, the broadband signal source 44 and the analyzing unit 46 are housed within a common housing.

In FIG. 3, a flow-chart is shown representing a method for simulating an echo signal wherein the echo signal corresponds to a moving target.

Accordingly, a broadband signal is input to the device 10 that is typically used for radar surveillance, in particular detecting objects. The input signal can be mixed by using the mixing stage 38.

Further, the frequency bandwidth of the input signal is changed by using the first bandwidth changing unit 22, in particular decreased by the divider 24, for further processing the input signal.

The signal having a decreased frequency bandwidth is forwarded to the signal manipulation unit 16 that manipulates the input signal for simulating the echo signal. As the signal manipulation unit 16 uses digital techniques, the analog input signal is digitized before by using the analog to digital converter 30.

The digitized input signal is then manipulated with regard to the IQ data. For instance, a delay can be added to the input signal for simulating a certain distance of the simulated target, the frequency of the input signal can be shifted for simulating a certain speed of the simulated target and/or the amplitude of the input signal can be changed for simulating a certain size and/or distance of the simulated target.

After the manipulating step, the manipulated signal is reconverted into an analog signal by using the digital to analog converter 32. The reconverted signal is then fed to the second bandwidth changing unit 26 for increasing the frequency bandwidth. Accordingly, the second bandwidth changing unit 26 is a multiplier 28. Particularly, the frequency bandwidth is multiplied to the original one that has been divided previously.

Further, the multiplied signal is mixed again by using the second mixing stage 40. The second mixing stage 40 is connected to the same local oscillator 36 as the first mixing stage 38 is.

Accordingly, a broadband signal, in particular a radio frequency signal, is output via the output 14 that simulates the echo signal of the input signal wherein the output signal has the original frequency bandwidth of the input signal.

The device 10 and the system 42 enable testing radar sensors having a high bandwidth appropriately.

In general, a moving target can be simulated as digital techniques are applied for manipulating the signal processed by the device 10. In addition, a high signal bandwidth (broadband signal) can be used and simulated since the frequency of the signal processed by the device 10 is changed such that the signal manipulation unit 16, in particular the analog to digital converter 30 and the digital to analog converter 32, do not have any limiting effect on the frequency bandwidth of the signal.

The invention claimed is:

1. A device for simulating at least one echo signal of a signal, said device comprising:
    an input for receiving the signal;

a signal manipulation unit; and an output for transmitting the signal processed by said signal manipulation unit that is connected to said input via an input line and to said output via an output line, said signal manipulation unit being configured to add a delay to the signal, to change the frequency of the signal and/or to change the amplitude of the signal, said device further comprising;

a first bandwidth changing unit that is positioned in said input line, said first bandwidth changing unit being configured to decrease the frequency bandwidth of the signal, said device further comprising a second bandwidth changing unit that is positioned in said output line, said first bandwidth changing unit being configured to increase the frequency bandwidth of the signal processed.

2. The device according to claim 1, wherein said first bandwidth changing unit is configured to decrease the frequency bandwidth of said signal, in particular wherein said first bandwidth changing unit is located nearer to said input than to said output.

3. The device according to claim 1, wherein said first bandwidth changing unit is a divider, in particular a divider being consistent with regard to the amplitude.

4. The device according to claim 1, wherein said second bandwidth changing unit is configured to increase the frequency bandwidth of said signal, in particular wherein said at least one bandwidth changing unit is located nearer to said output than to said input.

5. The device according to claim 1, wherein said second bandwidth changing unit is a multiplier, in particular a multiplier being consistent with regard to the amplitude.

6. The device according to claim 1, wherein said first bandwidth changing unit is positioned before said signal manipulation unit.

7. The device according to claim 1, wherein said second bandwidth changing unit is positioned after said signal manipulation unit.

8. The device according to claim 1, wherein said signal manipulation unit is positioned between said first and second bandwidth changing units.

9. The device according to claim 1, wherein said signal manipulation unit is positioned between said first bandwidth changing unit and said second bandwidth changing unit, said first bandwidth changing unit being configured to decrease the frequency bandwidth of said signal, said second bandwidth changing unit being configured to increase the frequency bandwidth of said signal.

10. The device according to claim 1, wherein an analog to digital converter and a digital to analog converter are provided, said signal manipulation unit being positioned between said analog to digital converter and said digital to analog converter.

11. The device according to claim 1, wherein at least one mixing stage is provided, said mixing stage being assigned to said first bandwidth changing unit.

12. A system for simulating at least one echo signal of a signal, comprising a broadband signal source and a device according to claim 1.

13. A method for simulating at least one echo signal of a signal by using a device for simulating at least one echo signal of a signal, the method comprising the following steps:

inputting a signal via an input of said device;

changing the frequency bandwidth of the signal by using a first bandwidth changing unit of said device, converting the signal with changed frequency bandwidth by using an analog to digital converter of said device, manipulating said digitized signal by using a signal manipulation unit of said device; and reconverting the manipulated signal into an analog signal by using a digital to analog converter of said device, and changing the frequency bandwidth of the reconverted analog signal after said signal manipulation unit by using a second bandwidth changing unit of said device.

14. The method according to claim 13, wherein a delay is added to said signal, the frequency of said signal is changed and/or to the amplitude of said signal is changed during the manipulating step.

15. The method according to claim 13, wherein the frequency bandwidth of said signal is decreased before the manipulating step.

16. The method according to claim 13, wherein the frequency bandwidth of said signal is increased after the manipulating step.

17. A device for simulating a least one echo signal of a signal, said device comprising an input for receiving the signal, a signal manipulation unit and an output for transmitting the signal processed by said signal manipulation unit that is connected to said input via an input line and to said output via an output line, said signal manipulation unit being configured to add a delay to the signal, to change the frequency of the signal and/or to change the amplitude of the signal, said device further comprising at least one bandwidth changing unit, said bandwidth changing unit being configured to change the frequency bandwidth of the signal, wherein said at least one bandwidth changing unit is positioned in said input line or said output line, and wherein said at least one bandwidth changing unit is a divider or a multiplexer, which is consistent with regard to the amplitude.

* * * * *